United States Patent
Coleman (10) Patent No.: US 9,414,707 B2
(45) Date of Patent: Aug. 16, 2016

(54) SYSTEM AND METHOD OF COOKING USING INFRARED RADIANT ENERGY

(71) Applicant: WKI Holding Company, Inc., Rosemont, IL (US)

(72) Inventor: Brian L. Coleman, Rosemont, IL (US)

(73) Assignee: WKI HOLDING COMPANY, INC., Rosemont, IL (US)

(*) Notice: Subject to any disclaimer, the term of this patent is extended or adjusted under 35 U.S.C. 154(b) by 166 days.

(21) Appl. No.: 14/056,129

(22) Filed: Oct. 17, 2013

(65) Prior Publication Data

US 2015/0108106 A1    Apr. 23, 2015

(51) Int. Cl.
*F27D 11/00*    (2006.01)
*A47J 27/00*    (2006.01)

(52) U.S. Cl.
CPC .............. *A47J 27/004* (2013.01); *A47J 27/002* (2013.01)

(58) Field of Classification Search
CPC .......... A47G 23/04; A47J 43/00; A47J 43/28; A47J 27/04; A47J 27/08; A47J 27/09; A47J 27/12; A47J 27/086; A47J 27/004; A47J 27/068; A47J 36/10; A47J 36/36; H05B 1/0266; Y10T 292/34; F24C 1/14; F24C 7/04; F24C 7/00
See application file for complete search history.

(56) References Cited

U.S. PATENT DOCUMENTS

| 6,114,666 | A | 9/2000 | Best |
| 7,853,129 | B2 | 12/2010 | Best |
| 7,943,888 | B2 * | 5/2011 | Barnes ................. H05B 1/0266 219/432 |
| 8,227,728 | B2 | 7/2012 | Best |
| 2008/0072890 | A1 | 3/2008 | Best |
| 2014/0227401 | A1 * | 8/2014 | Kounlavong ............ A47J 27/09 426/231 |

* cited by examiner

*Primary Examiner* — Shawntina Fuqua
(74) *Attorney, Agent, or Firm* — McDermott Will & Emery LLP (57) ABSTRACT

Disclosed are cooking devices and assemblies that employ infrared radiant energy to cook food. One cooking assembly includes a cooker including a body having a cooker lid configured to engage a top of the body, an inner layer arranged within the body and defining a heating cavity within the cooker, a heating element arranged within the heating cavity and configured to heat the heating cavity, and a cooking vessel made of a transmissive material and configured to be arranged within the heating cavity, the cooking vessel defines a cooking cavity configured to receive food therein, wherein the heating element convectively heats the cooking vessel and infrared radiant energy is thereby emitted from interior surfaces of the cooking vessel into the cooking cavity to cook the food.

13 Claims, 9 Drawing Sheets

SYSTEM AND METHOD OF COOKING USING INFRARED RADIANT ENERGY

BACKGROUND

The present disclosure generally relates to radiant cooking devices and, more particularly, to cooking devices and assemblies that employ infrared radiant energy to cook food.

There are essentially three ways to cook food, via conduction, via convection, and via radiation. Cooking via conduction entails the direct transfer of heat from one component to another. For example, when cooking food in a frying pan, the hot pan maintains contact with the food and thereby transfers heat to the food by directly touching it. Similarly, when cooking food on a grill, the food is cooked via conduction by directly contacting the heated cooking grate (i.e., the grill surface) and by hot gases, via convection. Cooking via convection is typically the slowest and least efficient form of cooking.

Cooking via convection entails transferring heat through a fluid medium to the food. For example, a potato boiled in water is cooked by conduction as the water transfers heat to the potato. Similarly, a chicken cooked in an oven is cooked by convection as the gases (i.e., air) surrounding the chicken transfer heat to the chicken. Convection cooking also occurs on a grill in the form of indirect grilling as the flow of hot air surrounds the food on the grill.

Cooking via radiation is quite different from conduction and convection cooking and entails using a form of electromagnetic energy that is directed at the food to be cooked. Radiation cooking is generally accomplished using radiant heat, infrared, or microwaves, and includes cooking in common household appliances, such as microwaves and toasters. Infrared is increasingly becoming the method of choice for many cooks, and is commonly known as broiling.

SUMMARY OF THE INVENTION

The present invention relates generally to providing a casing exit for a lateral borehole, and more particularly to systems and methods for providing a casing exit with little or no milling of the casing.

In some embodiments, a cooking assembly is disclosed. The cooling assembly may include a cooker including a body having a cooker lid configured to engage a top of the body, an inner layer arranged within the body and defining a heating cavity within the cooker, a heating element arranged within the heating cavity and configured to heat the heating cavity, and a cooking vessel made of a transmissive material and configured to be arranged within the heating cavity, the cooking vessel defining a cooking cavity configured to receive food therein, wherein the heating element convectively heats the cooking vessel and infrared radiant energy is thereby emitted from interior surfaces of the cooking vessel into the cooking cavity to cook the food.

In other embodiments, a method is provided that includes arranging a cooking vessel within a heating cavity defined within a cooker, the cooking vessel being made of a transmissive material that exhibits an average emissivity of 0.8 or more, heating the cooking vessel with a heating element arranged within the heating cavity, and emitting infrared radiant energy from interior surfaces of the cooking vessel into the cooking cavity.

In yet other embodiments, another cooking assembly is disclosed. The additional cooking assembly may include a cooker defining a heating cavity therein, a heating element arranged within the heating cavity and configured to heat the heating cavity, and a cooking vessel made of a glass-ceramic and configured to be arranged within the heating cavity adjacent the heating element, wherein the heating element convectively heats the cooking vessel and infrared radiant energy is thereby emitted from interior surfaces of the cooking vessel into a cooking cavity defined within the cooking vessel.

The features and advantages of the present invention will be readily apparent to those skilled in the art upon a reading of the description of the preferred embodiments that follows.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure generally relates to radiant cooking devices and, more particularly, to cooking devices that employ infrared radiant energy to cook food.

The embodiments disclosed herein provide a cooking assembly that uses infrared radiant energy to cook food. The cooking assembly includes a cooker that may include a heating element configured to conductively heat a cooking vessel placed within the cooker. The cooking vessel may be made of a generally transmissive material, as opposed to opaque materials, such that a larger percentage of the infrared radiant energy can be transmitted through the cooking vessel. The infrared radiant energy transmitted into the cooking vessel is then able to be emitted toward and absorbed by the food placed within the cooking vessel. Suitable transmissive materials that may be used for the cooking vessel include, but are not limited to, glasses, glass-ceramics, stovetop ceramics, and vitro-ceramics.

Figure 1A:
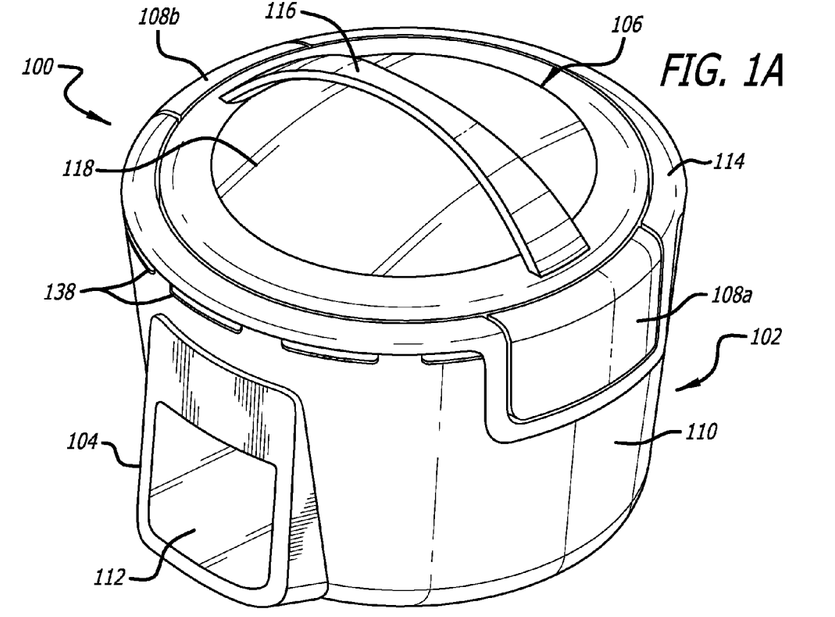
FIGS. 1A and 1B illustrate isometric and cross-sectional side views, respectively, of an exemplary cooker that may employ principles of the present disclosure, according to one or more embodiments.
Figure 1B:
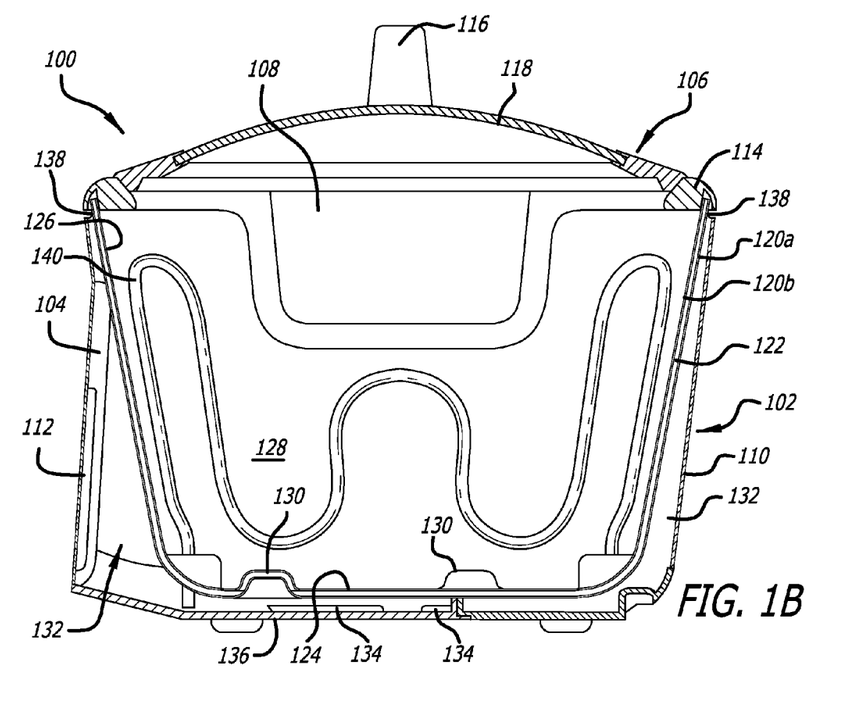

Referring to FIGS. 1A and 1B, illustrated are isometric and cross-sectional side views, respectively, of an exemplary cooker 100 that may employ principles of the present disclosure, according to one or more embodiments. As depicted in FIG. 1A, the cooker 100 may include a body 102, a user input module 104, a cooker lid 106, and a pair of side locks 108 (shown as side locks 108a and 108b). The body 102 may be an open-ended, generally cylindrical structure having a rounded, upright outer wall 110 that extends substantially about the entire circumference of the body 102. The body 102 may be made of any rigid material, such as metals. In at least one embodiment, the body 102 may be made of stainless steel or aluminum.

The user input module 104 may be arranged in or otherwise form an integral part of the outer wall 110. In some embodiments, the user input module 104 may protrude from the outer wall 110, as illustrated. In other embodiments, however, the user input module 104 may be mounted flush with the outer wall 110. The user input module 104 may provide a screen 112, such as a capacitive touch screen, liquid crystal display, or other type of known electronic visual display, thereby enabling a user to interactively operate the cooker 100. In use, for instance, the user may be able to program the cooker 100 via the screen 112, such as by setting a desired cooking temperature or a desired cooking time. Accordingly, the user input module 104 may further include a suitable timing mechanism or device. The screen 112 may further provide or display a real-time status of the cooker 100, such as its current internal temperature or a current cook time.

The cooker lid 106 may be configured to generally occlude the opening at the top of the body 102. To accomplish this, as illustrated, the cooker lid 106 may engage or otherwise sit against a top 114 of the body 102. The cooker lid 106 may include a handle 116 used to manipulate the position of the cooker lid 106. In some embodiments, a portion 118 of the cooker lid 106 may be made of a transparent or translucent material, such as glass or a high-temperature resin plastic. As will be appreciated, the portion 118 may be used to view the food being cooked within the cooker 100.

The side locks 108*a,b* may be pivotably coupled to the body 102 and used to secure the cooker lid 106 to the body 102 for operation. As will be discussed in greater detail below, the side locks 108*a,b* may also provide a user access to a cooking vessel disposed within the cooker 100. While two side locks 108*a,b* are shown in FIGS. 1A and 1B, it will be appreciated that more than two side locks 108*a,b* may be employed. In at least one embodiment, only a single side lock 108 may be employed, without departing from the scope of the disclosure. In at least one embodiment, as illustrated, the side locks 108*a,b* may be arranged circumferentially opposite each other about the outer wall 110 of the body 102. During use, the side locks 108*a,b* may be closed in order to help retain heat within the cooker 100.

With reference to FIG. 1B, the cooker 100 may further include a mid-layer 120*a* and an inner layer 120*b* arranged within the body 102. As illustrated, the inner layer 120*b* may be nested within and radially offset from the mid-layer 120*a* such that a small gap 122 is defined therebetween. In some embodiments, the gap 122 may be filled with an insulative material (not shown). In other embodiments, however, the gap 122 may be vacuous and otherwise filled with air. Both the mid and inner layers 120*a,b* may be made of any rigid material, such as metals. In at least one embodiment, the mid and inner layers 120*a,b* may be made of stainless steel, for example.

The inner layer 120*b* may include an inner base 124 and an inner wall 126 that extends generally upward from the inner base 124 within the cooker 100. The inner base 124 and the inner wall 126 cooperatively define a heating cavity 128 within the cooker 100. Moreover, the inner base 124 may define or otherwise provide one or more protrusions 130 (two shown) that extend a short distance into the heating cavity 128. As will be discussed below, the protrusions 130 may be configured to support a cooking vessel (not shown) within the heating cavity 128 and otherwise help maintain the cooking vessel offset from the inner base 124 such that infrared radiant energy is able to infuse or extend below the cooking vessel during operation. While two protrusions 130 are depicted in FIG. 1B, it will be appreciated that more than two protrusions 130 may be employed. Moreover, in at least one embodiment, a single protrusion 130 may be employed, without departing from the scope of the disclosure.

A convection cavity 132 may be defined between the mid-layer 120 and the inner walls of the body 102. One or more base vents 134 may be defined in an outer base 136 of the body 102 and otherwise may place the convection cavity 132 in fluid communication with the surrounding environment below the body 102. Moreover, one or more top vents 138 may be defined in the body 102 at or near the top 114 and may place the convection cavity 132 in fluid communication with the surrounding environment near the top 114. As discussed below, convection currents may be generated within the convection cavity 132 during operation, and the base and top vents 134, 138 may help vent the generated convection currents and thereby help cool the body 102.

The cooker 100 may further include a heating element 140 arranged within the heating cavity 128. The heating element 140 may be operatively coupled to the user input module 104 such that the user input module 104 is able to power and operate the heating element 140. In some embodiments, the heating element 140 may be configured to be powered using a standard 110-volt outlet connection. In other embodiments, the heating element 140 may be configured to be powered using a 220-volt outlet connection. The heating element 140 may be configured to provide a substantially uniform heat source within the heating cavity 128. To accomplish this, as illustrated, the heating element 140 may extend up and down and generally across the inner wall 126 of the inner layer 120*b* in various angles and/or directions. It will be appreciated, however, that the configuration or particular design of the heating element 140 is not vital to the principles of the present disclosure. Accordingly, the heating element 140 shown in FIG. 1B is provided for illustrative purposes only and therefore should not be considered as limiting.

Moreover, it will be appreciated that the heating element 140 may be replaced with any other type of heating unit or device capable of providing heat to the heating cavity 128. For example, in at least one embodiment, the heating element 140 may be replaced with a gaseous fuel burner, or the like, without departing from the scope of the disclosure.

Figure 2:
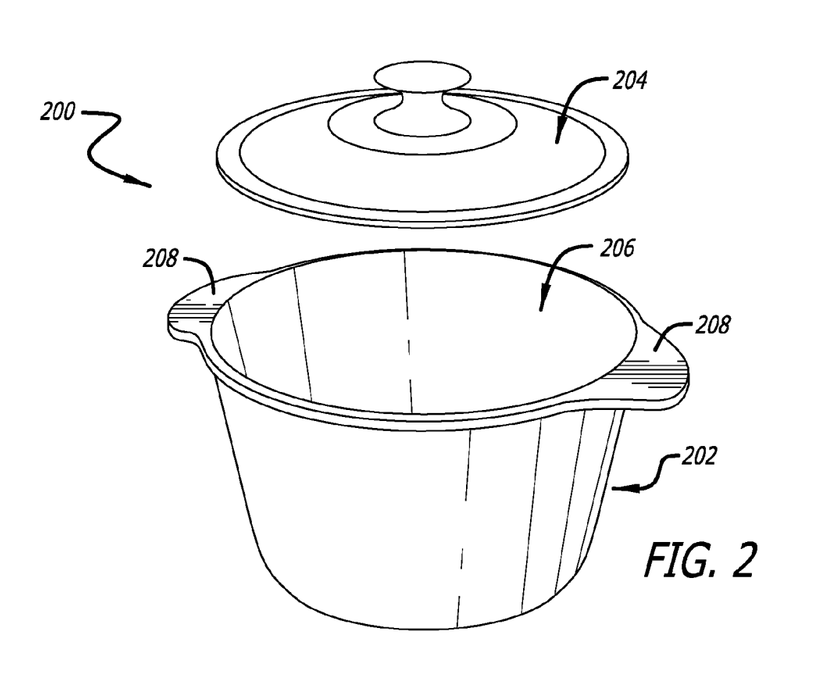
FIG. 2 illustrates an exploded view of an exemplary cooking vessel, according to one or more embodiments.

Referring now to FIG. 2, illustrated is an exploded view of an exemplary cooking vessel 200 that may be used with the cooker 100 of FIG. 1, according to one or more embodiments. As illustrated, the cooking vessel 200 may include a food receptacle 202 and a vessel lid 204 configured to mate with or otherwise sit on the top of the food receptacle 202 and thereby substantially cover or seal the food receptacle. The food receptacle 202 may provide or otherwise define a cooking cavity 206 configured to receive and contain the food (not shown) that is to be cooked. Handles 208 may be defined on the outer periphery of the food receptacle 202. To place the cooking vessel 200 within the heating cavity 128 (FIG. 1B) of the cooker 100, the handles 208 may be generally aligned with the side locks 108 (FIGS. 1A and 1B) in their open position.

The cooking vessel 200 may be made of an infrared transmissive material. As used herein, the term "transmissive material" refers to a material that transmits most of the radiation through the material without significant absorption and/or reflection. The transmissive material may be generally transparent, but may also be substantially translucent, without departing from the scope of the disclosure. Suitable transmissive materials may have an average emissivity of 0.8 or more over the range of wavelengths emitted, and is able to withstand temperatures of up to about 800° F. to about 1000° F. or greater. Moreover, suitable transmissive materials may exhibit a low coefficient of expansion (e.g., around 10) such that it is substantially resistant to thermal shock. As a result, the cooking vessel 200 may not be cracked or damaged by water or other liquids being exposed to it after it is heated. This resistance to thermal shock further enables water to be applied to the surface of the cooking vessel 200 while it is heated for cleaning.

In some embodiments, suitable transmissive materials that may be used in the embodiments disclosed herein include, but are not limited to, glasses, glass-ceramics, stovetop ceramics, or vitro-ceramics. In at least one embodiment, the cooking vessel 200 may be a cooking vessel selected from the VISIONS® line of cooking vessels commercially-available from World Kitchen, LLC of Rosemont, Ill., USA. In other embodiments, the cooking vessel 200 may take on a variety of shapes and/or configurations, such as three-dimensional cookware shapes known to those in the art.

In thermodynamics, as a result of conservation of energy, the absorptivity or absorption (A) of a material cannot exceed "one" (1). Consequently, for opaque materials, $A+R=1$, where R is the reflectance of the material body. For transmissive materials, however, $A+R+T=1$, where T is the transmissivity or transmission of the material. According to Kirchhoff's Law of thermal radiation, since the absorption (A) cannot exceed "one," the emissivity ($\epsilon$) of a material also cannot exceed "one" (1). As a result, Kirchhoff's Law at a particular wavelength and temperature yields:

$$A=\epsilon \quad \text{Equation (1)}$$

By substitution, the absorption equations above for opaque and transmissive material bodies become:

$$\epsilon+R=1 \quad \text{Equation (2)}$$

for opaque material bodies, and:

$$\epsilon+R+T=1 \quad \text{Equation (3)}$$

for transmissive material bodies.

Figure 3A:
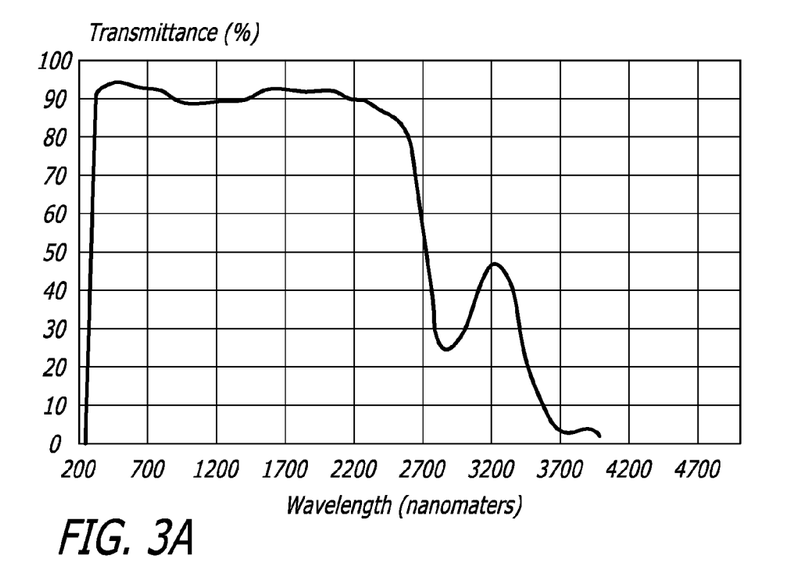
FIGS. 3A-3C depict infrared transmission curves as a function of wavelength for exemplary transmissive materials.
Figure 3B:
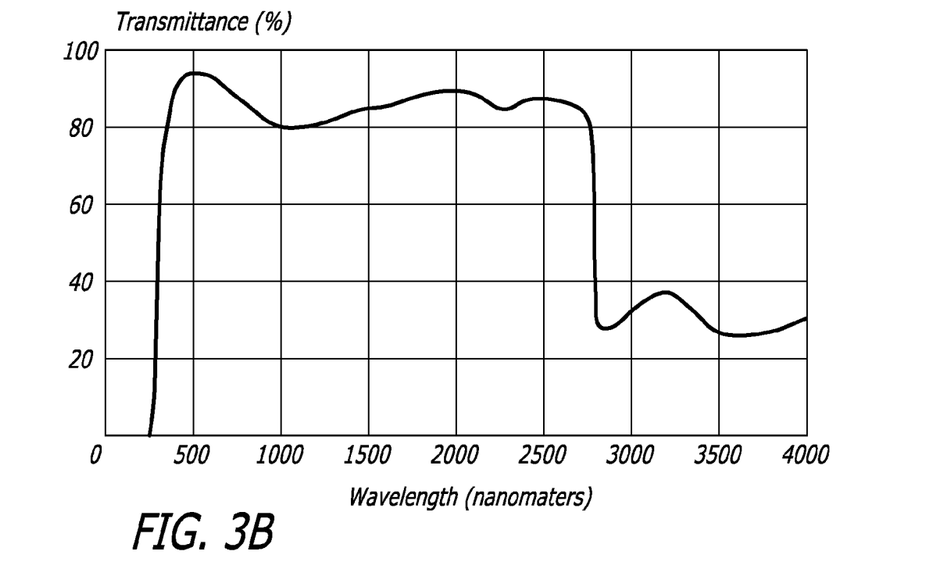
Figure 3C:
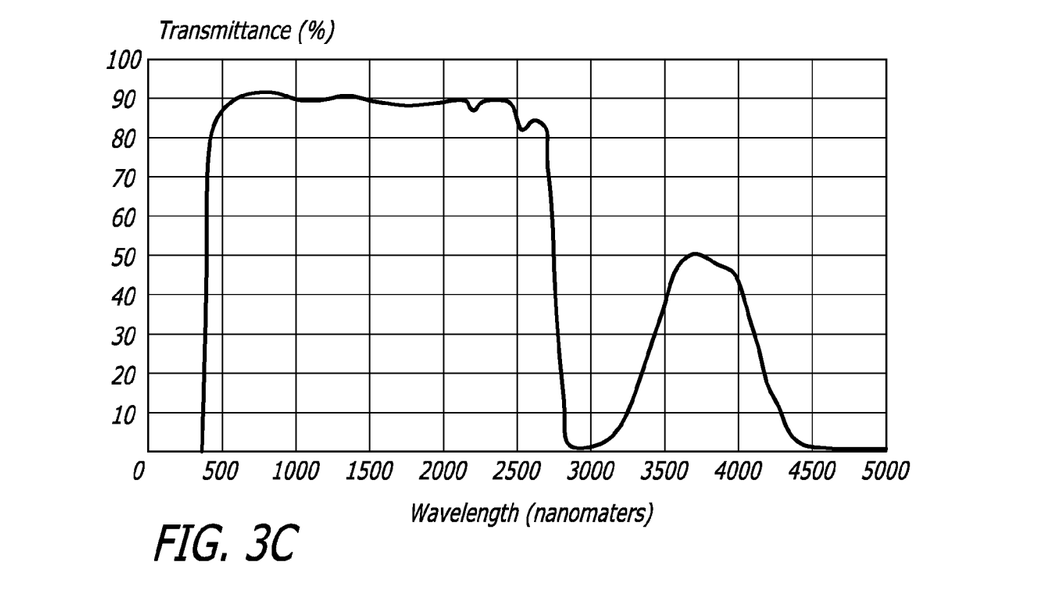

Referring to FIGS. 3A-3C, depicted are infrared transmission curves shown as a function of wavelength for three exemplary transmissive materials. The transmission curve of FIG. 3A generally corresponds to PYREX®, the transmission curve of FIG. 3B generally corresponds to soda lime glass, and the transmission curve of FIG. 3C generally corresponds to PYROCERAM® (a proprietary material used in the VISIONS® line of cooking vessels). It will be appreciated, however, that each of the transmission curves may equally be representative of most transmissive materials suitable for use in the present disclosure.

As depicted, the transmission curve of FIG. 3A shows that for infrared wavelengths less than about 2200 nm, more than 90% will be transmitted through the transmissive material. The transmission curve of FIG. 3B shows that for infrared wavelengths less than about 2600 nm, more than 80% will be transmitted through the transmissive material. The transmission curve of FIG. 3c shows that for infrared wavelengths less than about 2500 nm, more than 90% will be transmitted through the transmissive material. It should be noted that the peak of the infrared radiant energy that may be produced by the cooker 100 of FIGS. 1A and 1B is estimated to range from about 1700 nm to about 2200 nm, and generally less than about 2500 nm.

The transmission curves of FIGS. 3A-3C also show that longer wavelength infrared radiation is generally not transmitted through the transmissive material. When the infrared radiation is absorbed by the food (e.g., food contained within the cooking vessel 200 of FIG. 2), any re-radiated infrared radiation will be lower in energy, and thus propagating at longer wavelengths. Such longer wavelengths will generally not re-transmit through the transmissive materials of the cooking vessel 200, thereby advantageously trapping the heat inside the cooking vessel 200.

Table 1 below contains some typical total emissivity ($\epsilon$) values for a transmissive material (e.g., glass), opaque ceramic, and an opaque material (e.g., polished stainless steel) at various temperatures. Parameters relating to emissivity, absorption, and reflectivity for opaque ceramics generally fall between glass and polished stainless steel.

TABLE 1

| Material | Emissivity ($\epsilon$)/ Temperature | Ref's | Transmittance | Calculated Absorption | Calculated Reflectivity |
|---|---|---|---|---|---|
| Glass | 0.91-0.94 @20-100° C. | 3 | 90% | 91-94% | 6-9% |
|  | 0.87-0.72 @250-1000° C. | 3 | 90% | 71-87% | 15-35% |
| Opaque ceramic | 0.9-0.94 | 4 | 0% | 90-94% | 6-10% |
| Polished stainless steel | 0.16 @ 20° C. | 3 | 0% | 84% | 16% |
|  | 0.35@500° C. | 4 | 0% | 65% | 35% |

The transmittance for each material is generally based on corresponding transmission curves, such as FIGS. 3A-3C, and assuming the amount of infrared radiation at wavelengths greater than 2500 nm is negligible. It should be noted that the emissivity of the material can greatly vary based on surface structure, in addition to the material chemistry. Table 1 also provides the absorption and reflectivity percentages as calculated using the transmittance and emissivity values in conjunction with equations (2) and (3) above. As can be seen, transmissive materials yield more favorable transmittance, absorption, and reflectivity values as compared to opaque materials. As a result, infrared radiant energy is more efficiently utilized in transmissive materials as opposed to opaque materials.

Figure 4A:
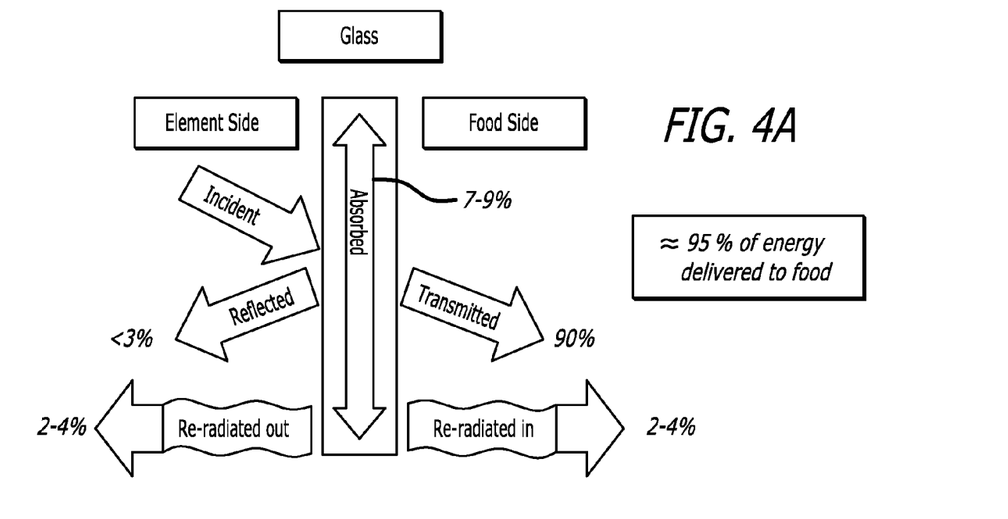
FIGS. 4A-4C illustrate schematic diagrams depicting infrared radiant energy transfer through various types of transmissive and opaque materials.
Figure 4B:
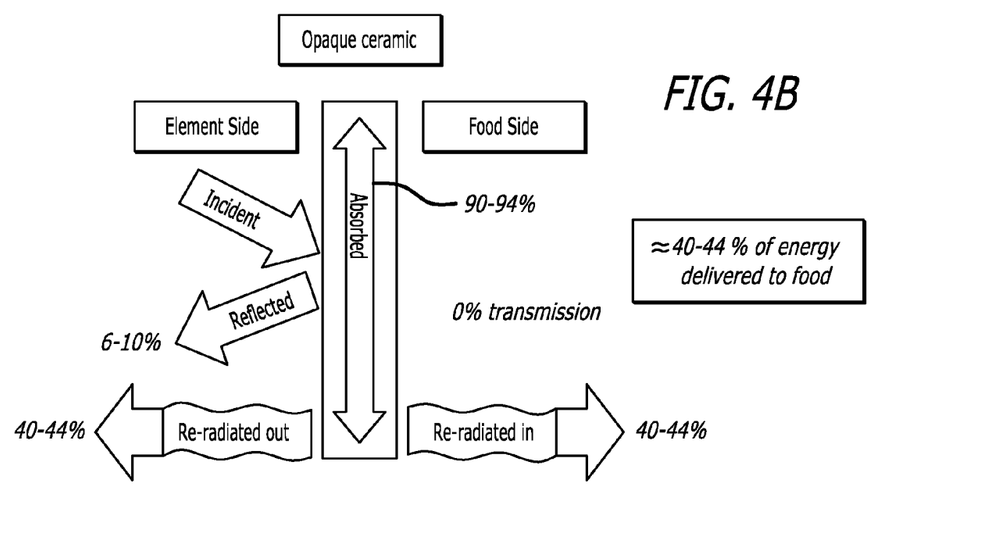
Figure 4C:
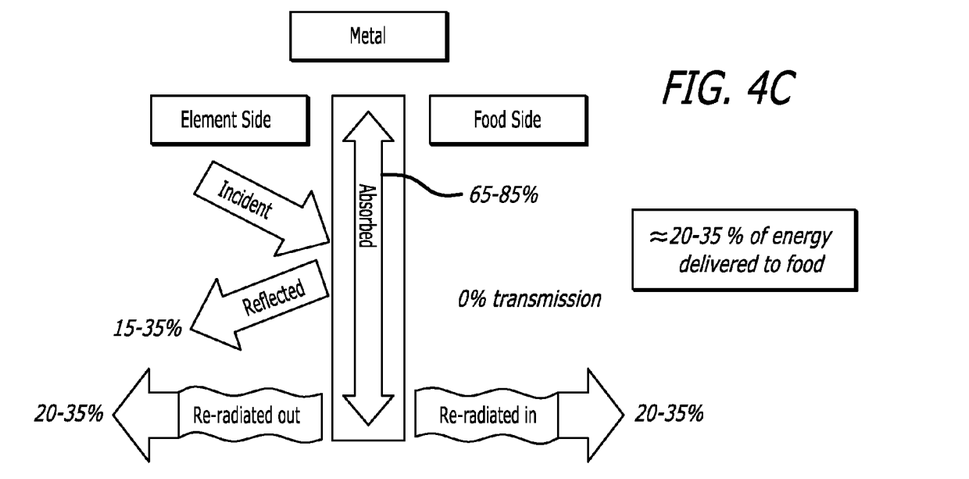

Referring now to FIGS. 4A-4C, illustrated are schematic diagrams depicting infrared radiant energy transfer through various types of transmissive and opaque materials. More particularly, each diagram depicts infrared radiant energy emanating from an "Element Side" (representative of the heating cavity 128 and heating element 140 of FIG. 1B), passing through a material (representative of the cooking vessel 200 of FIG. 2), and entering the "Food Side" (representative of the cooking cavity 206 of FIG. 2). In FIG. 4A, the infrared radiant energy interacts with a transmissive material (e.g., glass), where approximately 90% of the infrared radiant energy is transmitted therethrough to the food to be cooked and approximately 2-4% is re-radiated from the food once heated, thereby providing approximately 95% of the infrared radiant energy to the food to be cooked.

In stark contrast, FIG. 4B depicts infrared radiant energy interacting with an opaque material (e.g., opaque ceramic), where there is 0% transmission of the infrared radiant energy as most is absorbed by the material itself. Approximately 40-44% of the energy is re-radiated from the food once heated, thereby providing only about 40-44% of the infrared radiant energy to the food to be cooked. Likewise, FIG. 4C depicts the infrared radiant energy interacting with another opaque material (e.g., metal, such as stainless steel), where there is again 0% transmission of the infrared radiant energy as the majority is absorbed by the material itself. Approximately 20-35% of the energy is then re-radiated, thereby providing only about 20-35% of the infrared radiant energy to the food to be cooked. As will be appreciated, having a cooking vessel 200 (FIG. 2) made of a transmissive material, as opposed to an opaque material, may prove especially advantageous when using infrared radiant energy to cook the food.

Figure 5A:
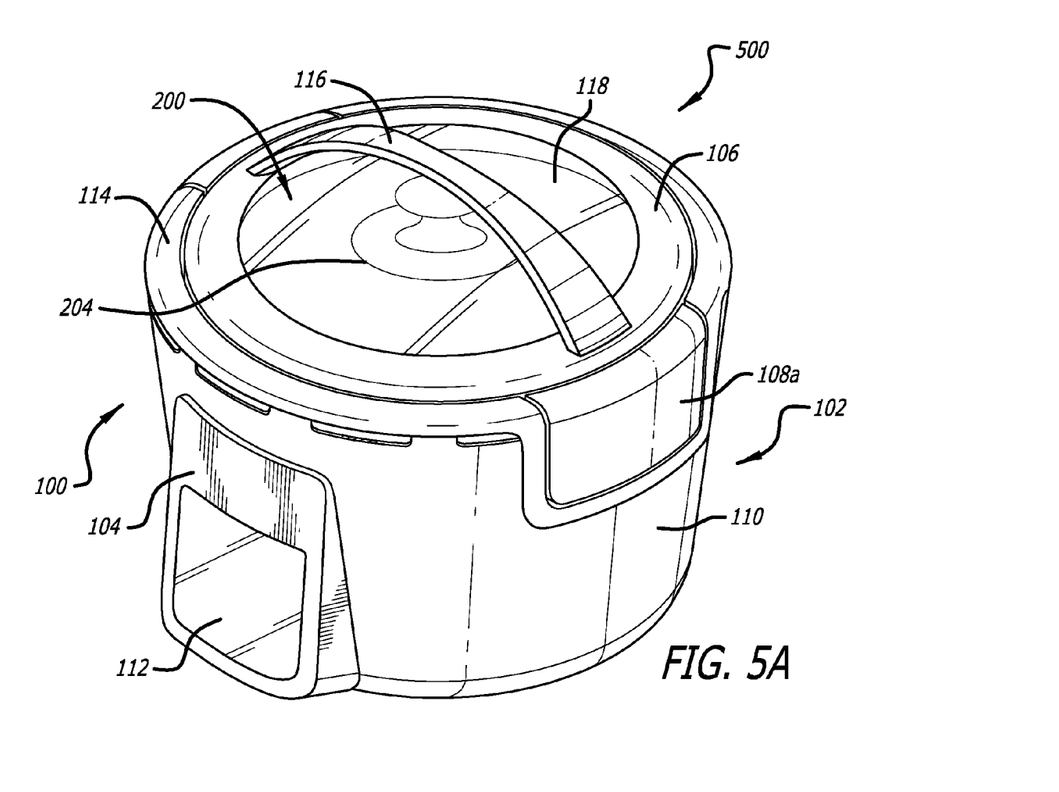
FIGS. 5A and 5B illustrate isometric and cross-sectional views of a cooking assembly, according to one or more embodiments of the present disclosure.
Figure 5B:
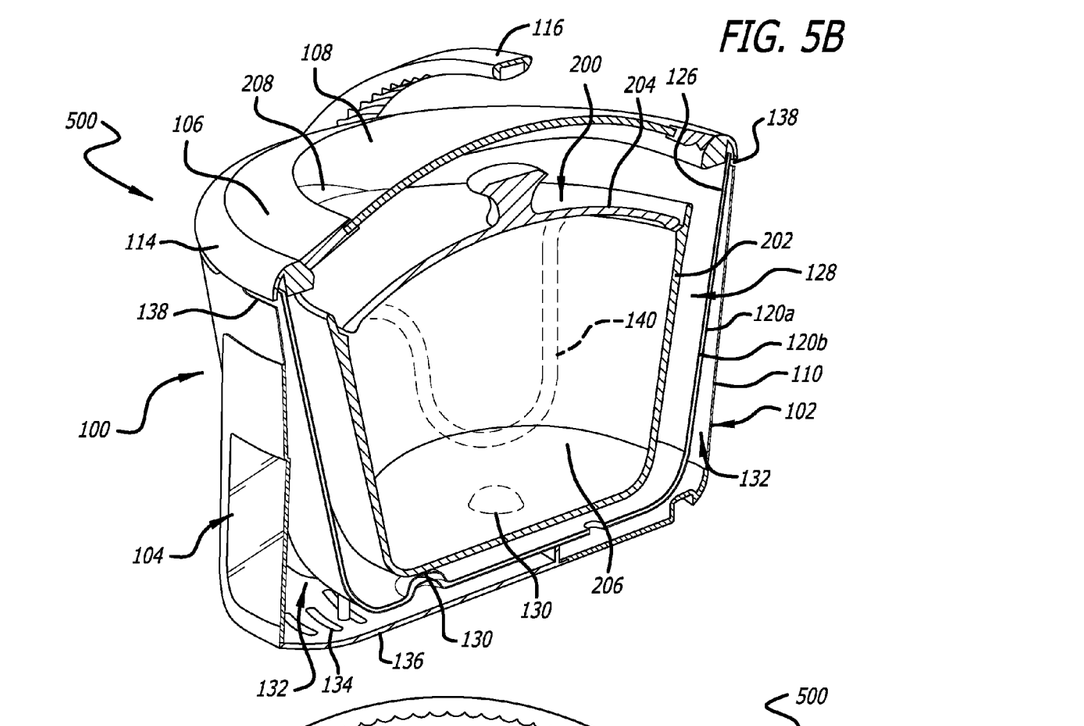

Referring now to FIGS. 5A and 5B, with continued reference to FIGS. 1A-1B and 2, illustrated are isometric and cross-sectional views of a cooking assembly 500, according to one or more embodiments of the present disclosure. Like numerals from FIGS. 1A-1B and 2 as used in FIGS. 5A-5B refer to like components not described again in detail. As illustrated, the cooking assembly 500 may include the cooker 100 and the cooking vessel 200 arranged within the cooker 100 and otherwise situated to cook food (not shown) present within the cooking cavity 206 of the cooking vessel 200.

Exemplary operation of the cooking assembly 500 is now provided, with general reference to FIG. 5B. The cooking vessel 200 may be placed in the heating cavity 128 within the cooker 100 by aligning the handles 208 with the side locks 108 while the side locks 108 are in their open position (e.g., pivotably opened). A combination of the inner wall 126 of the inner layer 120b and the side locks 108 may generally define indents configured to receive the handles 208 therein such that the cooking vessel 200 is able to be centrally located within the cooking cavity 128.

The cooking vessel 200 may rest on the protrusions 130 defined on the inner base 124 such that the bottom of the cooking vessel 200 is offset a short distance from the inner base 124. In some embodiments, the cooking vessel 200 is offset from the inner base 124 by about 0.1 inches, about 0.25 inches, about 0.4 inches, about 0.5 inches, about 0.75 inches, or any distance greater than 0.75 inches or between 0.1 inches and 0.75 inches. After the cooking vessel 200 is placed in the heating cavity 128, the cooker lid 106 may be placed atop the body 102 of the cooker 100 at the top 114. In some embodiments, the side locks 108 may then be pivotably moved to their closed positions and lock the cooker lid 106 in place, and may also substantially enclose the cooking vessel 200 within.

The heating element 140 arranged in the heating cavity 128 may be operated to generate heat before or after the cooking vessel 200 is placed in the heating cavity 128. As mentioned above, the user input module 104 may be used to power and operate the heating element 140 and thereby provide a substantially uniform heat to the heating cavity 128. As the temperature within the heating cavity 128 begins to rise, convection currents may be generated within the convection cavity 132. The convection process pulls air into the convection cavity 132 via the one or more base vents 134 defined in the outer base 136 of the body 102. The convection currents (in the form of heated air) rise through the convection cavity 132 and are vented to the surrounding environment via the one or more top vents 138 defined in the body 102 at or near the top 114. As a result, the convection currents remove outer heat and help cool the body 102 during operation.

The heating element 140 may be configured to heat the outer surfaces of the cooking vessel 200 (i.e., the outer surfaces of the food receptacle 202 and the vessel lid 204). Heat is conducted through the cooking vessel 200 (e.g., through the walls of the food receptacle 202 and the vessel lid 204) and to the inner surfaces of the cooking vessel 200 (e.g., the inner surfaces of the food receptacle 202 and the vessel lid 204), which cooperatively define the cooking cavity 206. Since the cooking vessel 200 is situated on the protrusions 130 and thereby offset a short distance from the inner base 124, heat from the heating element 140 is also able to conduct through the bottom of the cooking vessel 200. As a result, all the inner surfaces of the cooking vessel 200 are heated and infrared radiant energy is emitted therefrom into the cooking cavity 206. The infrared radiant energy emitted from the cooking vessel 200 is absorbed by the food contained within cooking cavity 206.

With the vessel lid 204 in place on the food receptacle 202, the cooking cavity 206 essentially (e.g., substantially) becomes a closed cavity into which the infrared radiant energy is emitted, so that the infrared radiant energy may approach black body conditions. The degree of infrared radiant energy emitted from the interior surfaces of the cooking vessel 200 may be a function of the Stefan-Boltzmann law with the infrared radiant energy being constantly emitted, absorbed, and reflected by the interior surfaces. When there is not an absorbing medium (food) within the cooking cavity 206, at some point there will exist an equal exchange of the infrared radiant energy between the surfaces within the cooking cavity 206 except for the difference in losses to the exterior from the various surfaces based on their location. When food is placed within the cooking cavity 206, however, the infrared radiant energy will be generated based on the Stefan-Boltzmann equation with the emissivity being considered nearly black (equal to one). The resulting equation will then be:

$$Q=0.173\times10^{-8}(A)(T_1^4-T_1^4)$$ Equation (4)

where Q is the energy generated; A is the area of emitting surface; $T_1$ is the temperature (° R) of the emitter (the cooking vessel 200) and $T_2$ is the temperature (° R) of the absorber (the food). Except for wall losses, the energy generated will be absorbed by the food being cooked. Advantageously, as discussed above, using a transmissive material for the cooking vessel 200, a maximum amount of infrared radiant energy is able to be emitted by the cooking vessel and absorbed by the food being cooked within the cooking cavity 206. This allows the food to heat much faster with less energy usage and allow for browning at higher temperature settings.

Figure 6A:
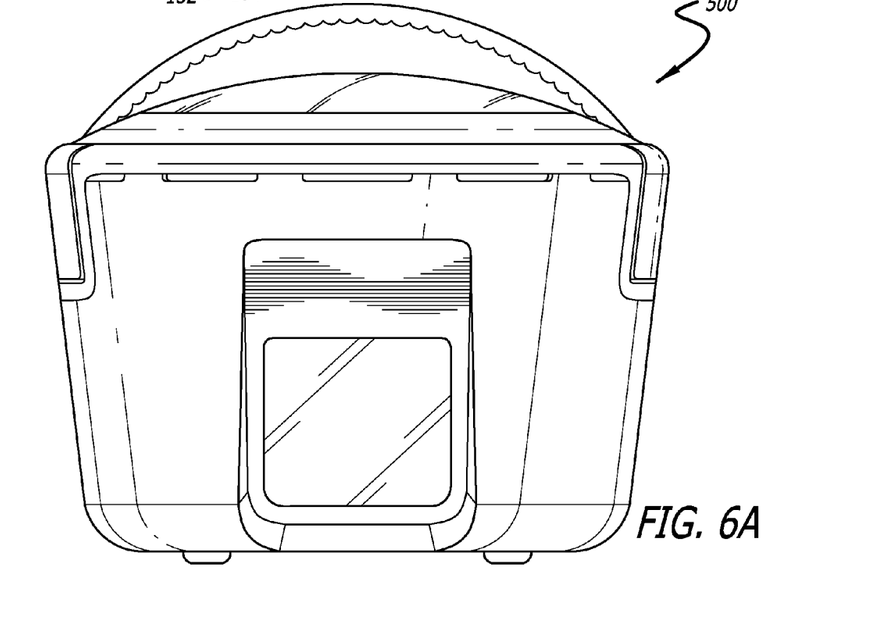
FIGS. 6A-6G depict various views of the cooking assembly of FIGS. 5A and 5B.
Figure 6B:
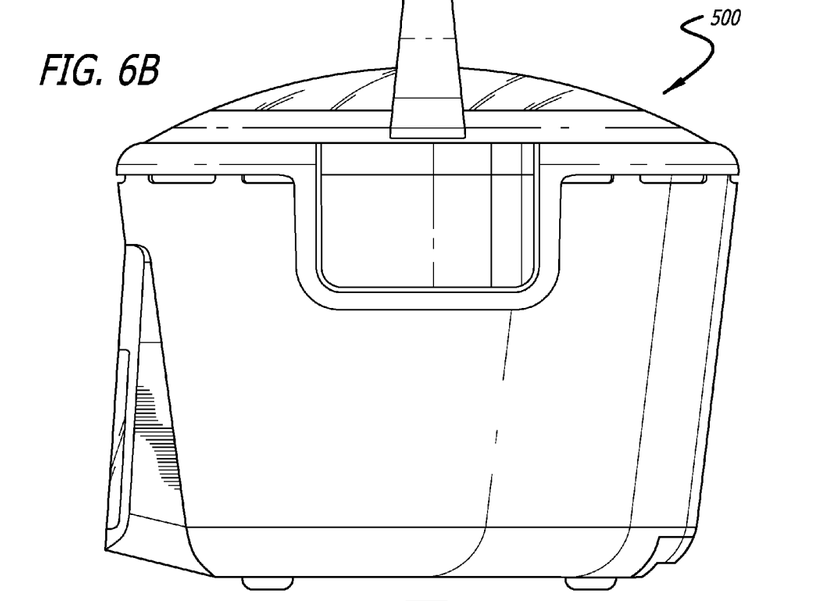
Figure 6C:
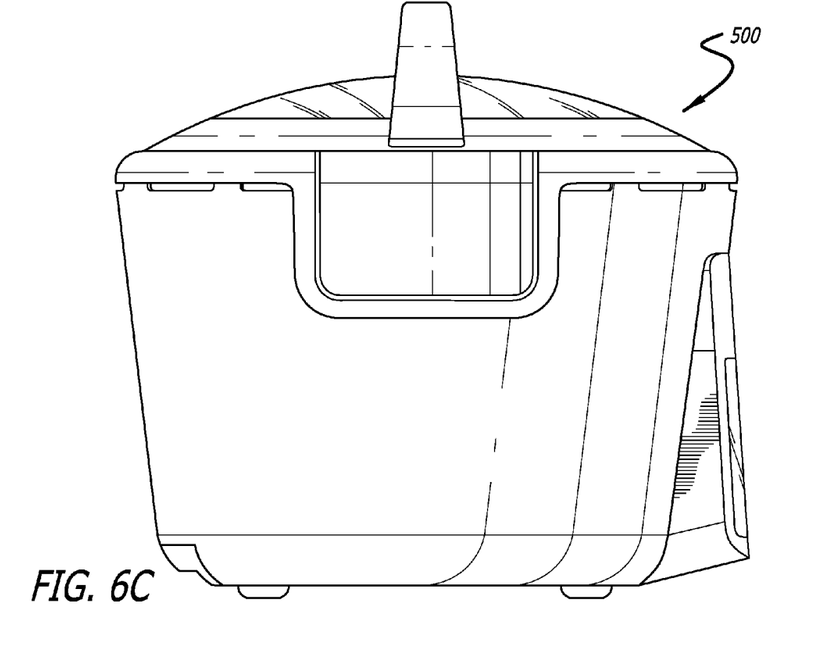
Figure 6D:
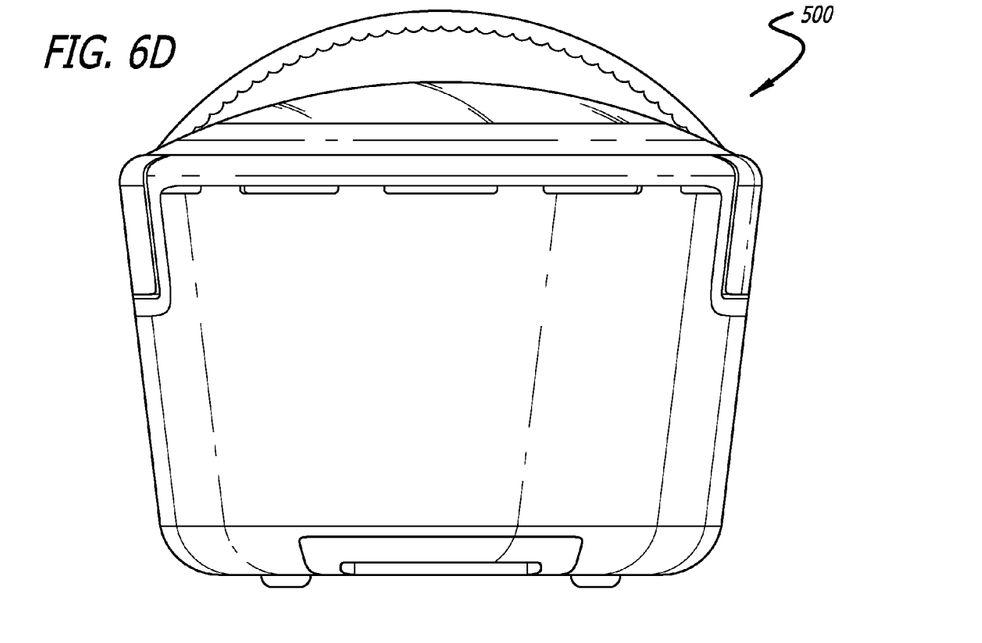
Figure 6E:
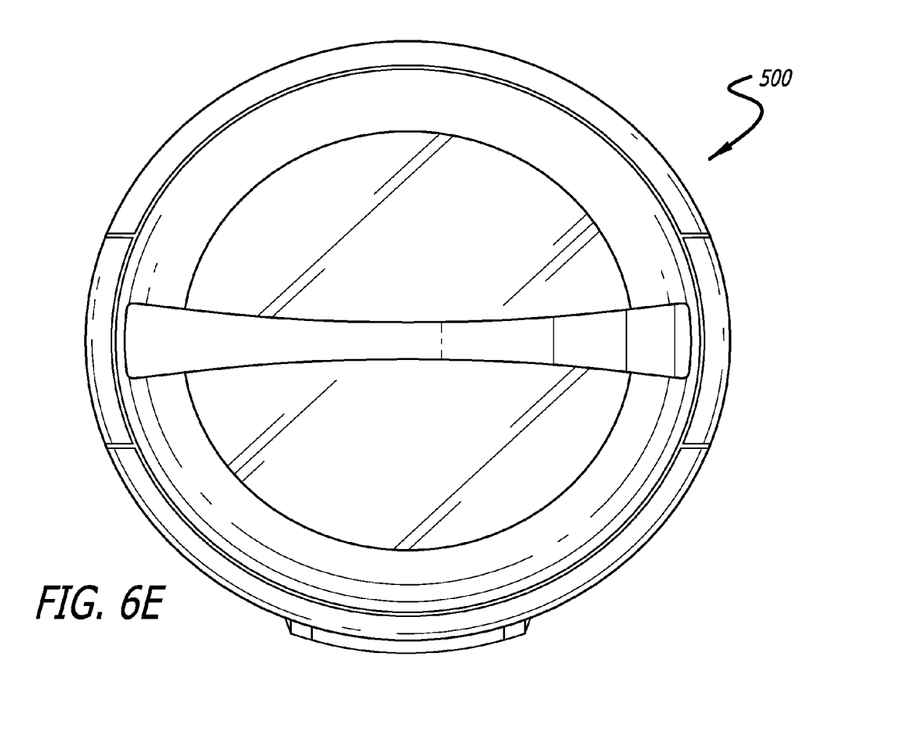
Figure 6F:
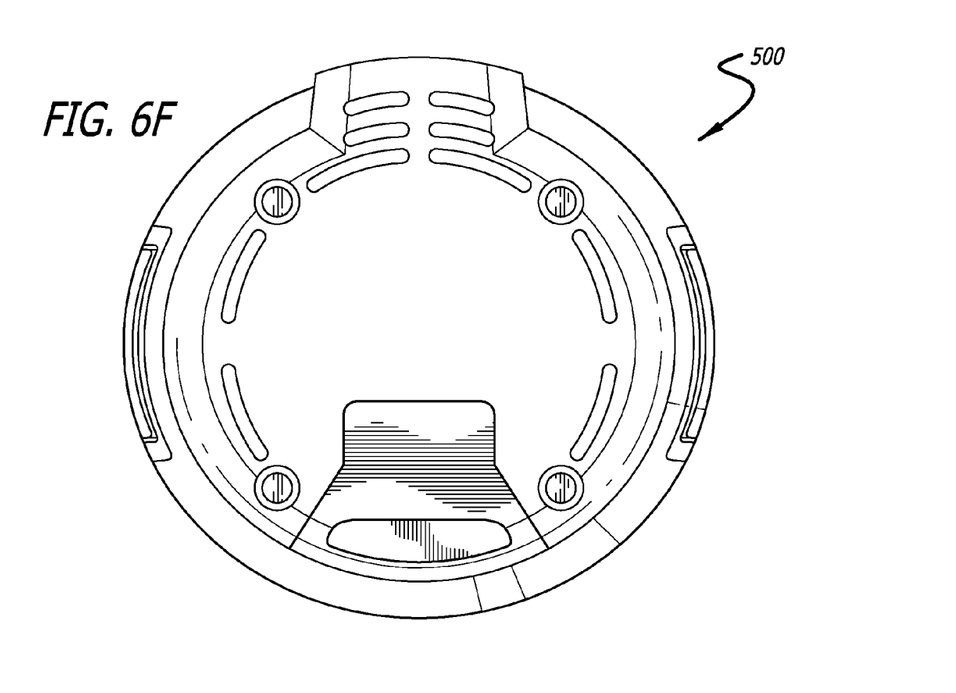
Figure 6G:
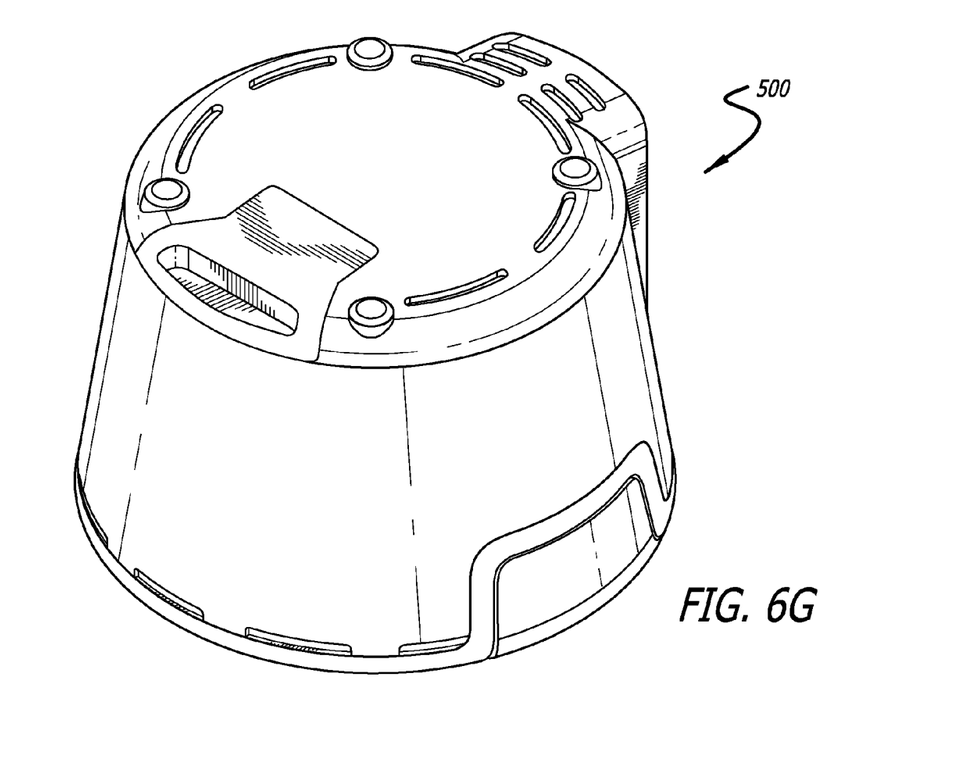

Referring now to FIGS. 6A-6G, illustrated are various views of the exemplary cooking assembly 500. More particularly, FIGS. 6A-6D depict side views of the cooking assembly 500 at approximately 90° view intervals about its periphery. FIG. 6E depicts a top view of the cooking assembly 500, and FIGS. 6F and 6G depict bottom and bottom isometric views of the cooking assembly 500, respectively.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A cooking assembly, comprising:
a cooker including a body having a cooker lid configured to engage a top of the body;
an inner layer arranged within the body and defining a heating cavity within the cooker;
a heating element arranged within the heating cavity and configured to heat the heating cavity;
a cooking vessel made of a transmissive material and configured to be arranged within the heating cavity, the cooking vessel defining a cooking cavity configured to receive food therein, wherein the heating element convectively heats the cooking vessel and infrared radiant energy is thereby emitted from interior surfaces of the cooking vessel into the cooking cavity to cook the food, wherein the transmissive material comprises a material selected from the group consisting of glasses, glass-ceramics, stovetop ceramics, high temperature plastics, and vitro-ceramics; and
protrusions defined on the inner base and configured to support the cooking vessel within the heating cavity such that the cooking vessel is offset from the inner base.

2. The cooking assembly of claim 1, wherein the cooking vessel comprises a food receptacle and a vessel lid configured to mate with the food receptacle, wherein the food receptacle and the vessel lid cooperatively define the cooking cavity.

3. The cooking assembly of claim 1, further comprising a user input module arranged on the body of the cooker and having a screen that enables a user to interactively operate the cooker.

4. The cooking assembly of claim 3, wherein the heating element is operatively coupled to the user input module such that the user input module is able to power and operate the heating element.

5. A method, comprising:
arranging a cooking vessel within a heating cavity defined within a cooker, the cooking vessel being made of a transmissive material that exhibits an average emissivity of 0.8 or more;
heating the cooking vessel with a heating element arranged within the heating cavity; and
emitting infrared radiant energy from interior surfaces of the cooking vessel into the cooking cavity,
wherein the cooker includes a body having an inner layer arranged therein, the inner layer including an inner base and an inner wall that extends generally upward from the inner base, the inner base and inner wall cooperatively defining the heating cavity, wherein arranging the cooking vessel within the heating cavity comprises:
supporting the cooking vessel on one or more protrusions defined on the inner base, the one or more protrusions offsetting the cooking vessel from the inner base; and
heating a bottom of the cooking vessel with the heating element.

6. The method of claim 5, wherein heating the cooking vessel with the heating element comprises:
convectively heating the cooking vessel with the heating element; and
conducting heat through the cooking vessel.

7. The method of claim 5, wherein the transmissive material comprises a material selected from the group consisting of glasses, glass-ceramics, stovetop ceramics, and vitro-ceramics.

8. The method of claim 5, wherein the cooker includes a body having a mid-layer and an inner layer arranged within the body, the inner layer being nested within and offset from the mid-layer, the method further comprising:
drawing in air into a convection cavity defined between the mid-layer and the body via one or more base vents defined in an outer base of the body, the one or more base vents fluidly communicating the convection cavity with a surrounding environment; and
venting heated convection currents to the surrounding environment via one or more top vents defined in the body near the top and fluidly communicating the convection cavity with the surrounding environment.

9. The method of claim 5, further comprising:
placing a cooker lid on the cooker after the cooking vessel is arranged within the heating cavity; and
locking the cooker lid on the cooker with one or more side locks provided on the cooker.

10. The method of claim 5, further comprising:
absorbing the infrared radiant energy with food contained within cooking cavity; and
re-radiating heat from the food back to the food with the cooking vessel.

11. A cooking assembly, comprising:
a cooker defining a heating cavity therein;
a heating element arranged within the heating cavity and configured to heat the heating cavity; and
a cooking vessel made of a glass-ceramic and configured to be arranged within the heating cavity adjacent the heating element, wherein the heating element convectively heats the cooking vessel and infrared radiant energy is thereby emitted from interior surfaces of the cooking vessel into a cooking cavity defined within the cooking vessel,
wherein the cooker further comprises:
a body
a mid-layer arranged within the body;
an inner layer nested within and offset from the mid-layer; and
an inner layer arranged within the body and defining including an inner base and an inner wall that extends generally upward from the inner base, wherein the inner base and the inner wall cooperatively define the heating cavity,
wherein the cooking assembly further comprises one or more protrusions defined on the inner base and configured to support the cooking vessel within the heating cavity such that the cooking vessel is offset from the inner base.

12. The cooking assembly of claim 11, further comprising:
a convection cavity defined between the mid-layer and the body;
one or more base vents defined in an outer base of the body and fluidly communicating the convection cavity with a surrounding environment; and
one or more top vents defined in the body near the top and fluidly communicating the convection cavity with the surrounding environment, wherein, during operation, air is drawn into the convection cavity via the one or more base vents and heated convection currents are vented to the surrounding environment via the one or more top vents.

13. The cooking assembly of claim 11, wherein the cooking vessel comprises a food receptacle and a vessel lid configured to mate with the food receptacle, wherein the food receptacle and the vessel lid cooperatively define the cooking cavity.

* * * * *